UNITED STATES PATENT OFFICE.

HARLEY WESLEY RHODEHAMEL, OF INDIANAPOLIS, INDIANA, ASSIGNOR TO THE ELI LILLY AND COMPANY, OF INDIANAPOLIS, INDIANA, A CORPORATION.

SUPPOSITORY.

1,366,941.  Specification of Letters Patent.  Patented Feb. 1, 1921.

No Drawing.  Application filed January 13, 1916.  Serial No. 71,993.

*To all whom it may concern:*

Be it known that I, HARLEY WESLEY RHODEHAMEL, a citizen of the United States, residing at Indianapolis, in the county of Marion and State of Indiana, have invented new and useful Suppositories and other Products Consisting of Medicinal Substances Incorporated with an Oil or Fat and Products Resulting From the Use of Such Method, of which the following is a specification.

It is the object of my invention to produce a suppository or similar product suitable for commercial handling in various climates, in a manner to enable the complete retention of the medicinal substances within a protective coating and at the same time to permit the dissolution of the coating or covering through contact with the body fluids in order to release the medicinal substances contained within the coating or covering.

Suppositories having an oil or a fat for a base must melt at the temperature of the body with which they come in contact at the time of administration. Consequently, they cannot be preserved in any climate where the temperature is as high or higher than the temperature of the body.

Various methods have been devised for overcoming this difficulty. For instance, empty gelatin capsules of proper shape have been made, into which the medicinal ingredients mixed with the oily or fatty base can be placed. Such capsules have the disadvantage of being very brittle if made thin enough to dissolve promptly upon being used, and unless the same are carefully sealed after being closed, the oil or fat will run out if it becomes melted.

I have discovered that I can overcome these objections by dipping suppositories into a solution of gelatin which forms a continuous coating, thus eliminating the possibility of leakage. This gelatin solution, I have found, can be rendered more effective for the purposes above set out, by the addition thereto of glycerin, glucose, acacia and other similar substances which renders the coating tough, pliable and more readily soluble. By these means, I have found that a coating or covering can be produced for a medicinal substance containing oils or fats, which will completely retain such substances and the oils and fats contained therein, thus making the finished product in a form to be easily and conveniently handled and marketed, practically without regard to the surrounding temperature and at the same time susceptible of convenient use by dissolution of the coating or covering upon contact with the body fluids for the release of the medicinal substance contained within the coating or covering.

The suppositories or other medicinal products upon which such coating is to be used are molded into the required shape and, while cold, are dipped into the coating solution herein above described which solution should be warmed to the proper temperature so as to be in a semi-liquid condition for such dipping. After one end has been dipped, the coating is allowed to harden and the other end is then dipped into such solution, and this results in a continuous coating or covering of the suppository or medicinal substance employed of a kind and with the qualities as above described.

Having described my invention, what I claim is:

A suppository composed of a vehicle for medicaments comprising a fatty body melting at body temperatures and having a coating thereon composed of gelatin and an additional agent capable of imparting toughness and increasing solubility to the coating, substantially as set forth.

In witness whereof, I, HARLEY WESLEY RHODEHAMEL, have hereunto set my hand at Indianapolis, Indiana, this 11th day of January, A. D. one thousand nine hundred and sixteen.

HARLEY WESLEY RHODEHAMEL.